Figure 2:
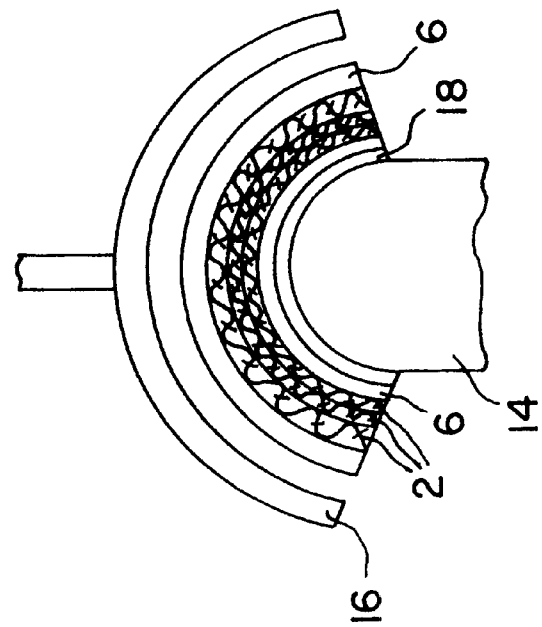

United States Patent [19]
Cochran

[11] Patent Number: 6,156,403
[45] Date of Patent: Dec. 5, 2000

[54] COMPOSITE MATERIALS AND PRODUCTS MADE THEREFROM

[75] Inventor: William H. Cochran, Exeter, R.I.

[73] Assignee: RanDemo, Inc., Exeter, R.I.

[21] Appl. No.: 09/187,418

[22] Filed: Nov. 6, 1998

Related U.S. Application Data

[62] Division of application No. 08/476,112, Jun. 7, 1995, Pat. No. 5,874,133.

[51] Int. Cl.$^7$ ........................................................ B32B 3/26
[52] U.S. Cl. ............................... 428/58; 428/46; 428/47; 428/57; 428/378; 428/383; 442/104; 442/170; 442/61; 442/86; 442/148; 442/164; 442/63
[58] Field of Search ................................. 428/46, 47, 57, 428/58, 904, 378, 383; 442/104, 170, 61, 86, 148, 164, 63

[56] References Cited

U.S. PATENT DOCUMENTS

| | | |
|---|---|---|
| 3,087,201 | 4/1963 | Williams et al. . |
| 3,152,949 | 10/1964 | Guthrie . |
| 3,597,307 | 8/1971 | Paulusma ................................. 161/170 |
| 3,817,819 | 6/1974 | Hoppe et al. . |
| 3,989,870 | 11/1976 | Bocks et al. ............................ 428/315 |
| 4,015,039 | 3/1977 | Segal et al. . |
| 4,023,835 | 5/1977 | Ewing et al. ............................ 285/235 |
| 4,051,100 | 9/1977 | Bjerk et al. ........................... 260/42.18 |
| 4,251,428 | 2/1981 | Recker et al. . |
| 4,288,563 | 9/1981 | Thorpe . |
| 4,353,955 | 10/1982 | Cook . |
| 4,596,835 | 6/1986 | Werner et al. . |
| 4,651,445 | 3/1987 | Hannibal . |
| 4,695,509 | 9/1987 | Cordova et al. ..................... 264/257 X |
| 4,738,999 | 4/1988 | Blenner et al. . |
| 4,766,014 | 8/1988 | Poletto ................................... 427/245 |
| 4,883,700 | 11/1989 | Harpell . |
| 4,892,780 | 1/1990 | Cochran et al. . |
| 4,894,281 | 1/1990 | Yagi et al. .............................. 428/286 |
| 4,916,000 | 4/1990 | Li et al. . |
| 4,936,085 | 6/1990 | Kolmes et al. . |
| 5,149,739 | 9/1992 | Lee . |
| 5,397,611 | 3/1995 | Wang .................................... 264/51 X |
| 5,503,879 | 4/1996 | Cochran .............................. 427/389.9 |

FOREIGN PATENT DOCUMENTS

| | | |
|---|---|---|
| 0 006 557 | 1/1980 | European Pat. Off. . |
| 0 240 118 | 10/1987 | European Pat. Off. ........ C08G 18/10 |
| 0 645 415 A1 | 3/1995 | European Pat. Off. . |
| 32 42 089 A1 | 5/1984 | Germany . |
| WO 92/00191 | 1/1992 | WIPO . |

OTHER PUBLICATIONS

Gunter, Polyurethan Handbook, pp. 212–213 and 329–330, 1994.
Chou, Journal of Materials Science, 24:761–783 (1989).
Chou et al, Scientific American, Oct. 1988, vol. 255, No. 4, pp. 193–203.
Avar et al, Polyurethane Handbook, Chapter 73, pp. 342–351 (1994).
Moder Plastics Encyclopedia, 1994, pp. 147–150.

*Primary Examiner*—Richard Weisberger
*Attorney, Agent, or Firm*—Pillsbury Madison & Sutro LLP

[57] ABSTRACT

An article which comprises (1) a composite comprising a polyurethane matrix including fibrous or particulate reinforcement, the polyurethane matrix being formed in situ about the reinforcement by reaction of polyurethane forming components at a temperature below the melting point of the reinforcement and (2) a polymeric film bound to at least one surface of the composite, the film being bound to the composite by adhesion to the polyurethane matrix which emerges or is enhanced as the matrix is formed in situ.

10 Claims, 4 Drawing Sheets

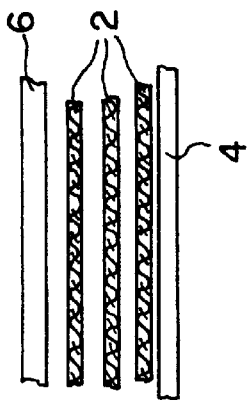
FIG. 1A
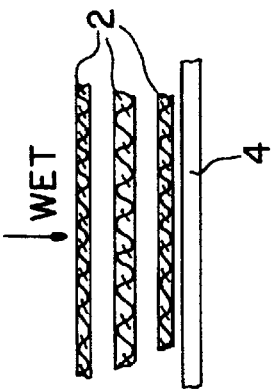
FIG. 1B
FIG. 1C
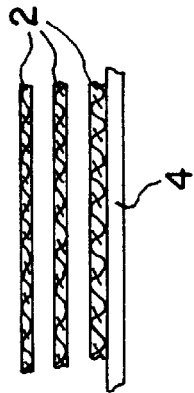
FIG. 1D
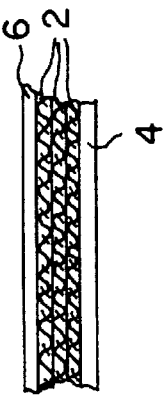
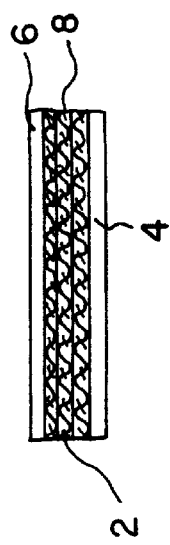
FIG. 1E

COMPOSITE MATERIALS AND PRODUCTS MADE THEREFROM

This is a division of application Ser. No. 08/476,112, filed Jun. 7, 1995, now U.S. Pat. No. 5,874,133.

BACKGROUND OF THE INVENTION

The present invention relates to certain novel composite materials and products made therefrom.

The composites and products of the invention are preferably prepared using the disclosure and teachings of my copending U.S. application Ser. No. 08/236,258, the entire contents of which are incorporated herein by reference. Said application makes reference to an article by Chou et al. entitled "Composites" appearing in *Scientific American*, October, 1986, Volume 255, No. 4, pages 192–203. This article, which includes an extensive discussion regarding composites comprising fibrous materials dispersed in various matrix materials, is also incorporated herein by reference. This article has a tacit assumption, consistent with industry thrust for some decades that designers/engineers of composites strive for high fiber-matrix bond levels. Ser. No. 08/236,258 teaches benefit from weak bond levels, soft, pliant, flexible resilient composites.

In Ser. No. 08/236,258, I have disclosed a composite material which comprises a polyurethane matrix reinforced with a fibrous material, e.g. one or more plies of fabric with a polyurethane matrix polymerized in situ, which is made by wetting the fibrous material with liquid polyurethane-forming reactants and allowing these to react at a temperature below the melting point of the fibrous material. The reaction results in the formation of a solid polymeric matrix as cure takes place. The rate of cure can be either accelerated by catalysts and heat or retarded by adding other chemicals or evacuating heat.

The present invention contemplates certain modifications in the product and process of Ser. No. 236,258 to enable the production of composite articles having a variety of properties as desired, for example, improved toughness, and the facility of producing three-dimensional products, cosmetic permanence, control of flexibility, control of grip, visual texture and barrier properties. Typical products contemplated by the invention include such varied articles as shoe outsoles, suitcases, furniture components, hoses, ducts, luggage, flags, awnings, the soft parts of umbrellas, decorated narrow tapes/straps, labels, helmets, seating, gloves, footwear, small boats, protective apparel and resilient floor and wall coverings or the like where such property combinations as flexibility, toughness, cosmetic variations and permanence, and breathability/fluid barriers are desired.

Broadly described, a product according to the invention comprises:

(1) a composite as in, for example, Ser. No. 08/236,258, comprising a solid polyurethane matrix surrounding a fibrous reinforcing material where the matrix is formed in situ by reaction of liquid matrix-forming materials about the fibrous material; and (2) a thermoplastic polymer film or the equivalent on one or both sides of the composite (1), the film being bound to the composite by adhesion to the polyurethane matrix, the adhesion being the result of physical and/or chemical reaction which occurs or is enhanced as the liquid matrix material cures to form the solid matrix.

The present products can be prepared in a variety of ways, for example, by placing one or more layers of the fibrous material on a flat or curved surface, over a male mold or across the cavity of a female mold or between the parts of a mating mold, wetting the layer(s) with a mixture of the polyurethane-forming reactants, placing the thermoplastic polymer film or its equivalent on the wetted layer(s) before any significant reaction occurs, causing the plies of the resulting layup to consolidate as desired and to take the shape of the mold as and when necessary and allowing the polyurethane-forming reaction to take place. This yields a flat or molded product with the polymer film adhesively bound to the polyurethane matrix.

The process as described above can be varied in numerous ways. For example, the layer(s) of fibrous material can be laminated to polymeric film prior to placing a layup containing such laminate on a mold or wetting it with the metered and mixed liquid parts from which a solid matrix will form in place on at least one surface of the film as well as on, around and among the fibers of the fibrous material.

The layers or plies of fibrous material may be wet while they are in place on a solid base or mold. Alternatively, they may be wet out before placing them on a base or mold, such as by passing them through a nip with the metered and mixed co-reactive parts present.

Wet and dry plies of fibrous material may be used in the same layup, with the dry plies becoming partially or thoroughly wet out by virtue of contact with wet plies and consolidation of the plies.

It is also possible to prepare a product comprising multiple alternate layers of the reinforced matrix and polymer film by building up a repeated series of wetted layers of fibrous material followed by polymer film, wetted layers, polymer film and so on to the desired thickness level provided successive plies are consolidated suitably before any significant polyurethane formation occurs.

The fibrous material is preferably in the form of a knitted, stitch-bonded, woven, braided or non-woven fabric although fibers, filaments or yarns Per se may also be used. Fabrics are, however, preferred as these facilitate wetting out and laying up of plies of fibers with the urethane-forming reactants prior to their positioning adjacent to one or more films. Typically, a plurality of fabric layers or plies are brought together, these plies are wet with the reactants, the polymer film is placed against the wetted plies and the process repeated as many times as desired before the polyurethane reaction is significantly underway.

The fibrous material may be of any available or engineered configuration or composition provided it has a melting point above the temperature of the polyurethane reaction. Typically, for example, the fibrous material comprises polyester, polyethylene, polypropylene, polyaramid, and/or like materials which do not harbor significant moisture but do have a significant quantity of reactive sites for the urethane-forming reactants. Mineral (typically with a bond promoter such as silane), animal, vegetable (including man-made cellulosics), nylon, acrylic, and like fibrous materials may be used in certain circumstances where higher levels of fiber-matrix bonding are desirable or where a cure is aided by moisture, such as a moisture-curing urethane.

The thermoplastic polymer film may also be of any desired composition, e.g. polyester, polyvinyl chloride or floride, polycarbonate, nylon, or polyurethane. Particularly desirable results are obtained when using polyurethane film having OH groups that can react with the polyurethane matrix parts as the matrix is being formed to provide improved bonding. Polyurethane films, typically thermoplastic polyurethane films, are available for use with such desirable properties as toughness, elasticity, clarity (including clarity after stretch or stretch/recovery), colorability (including good resolution of print thereon), barrier properties (permeability or resistance to passage of various categories of fluids), light stability, and chemical reactivity. The films which are used may be colored, printed, clear, smooth, textured, or perforated/pin-holed films. The thickness of such films can be widely varied and will depend on the product desired. A typical example is polyurethane film of two mils to 100 mils thickness, although it will be appreciated that other types of films and thickness can be used.

As indicated, the film may be clear (transparent) or it may be colored or carry a design, printing, texture, embossing, topography or the like on its surface. In one embodiment of the invention, a fabric layer within the matrix may be provided with a color, print or design so that if the polyurethane matrix and polymer film are transparent, the color, print or design will how through while being protected by the polymer film from wear, abrasion, sunlight or the like.

In another embodiment, the film itself may carry color, printing or a design either on an exposed surface or on an interior surface adjacent to the matrix in which case the film itself serves to protect the color, print or design.

Flexible or rigid molds, e.g. a vacuum bag against or over a rigid mold, may be used to shape the products of the invention as the polyurethane matrix is being formed in situ. Additionally, a release film may be used to facilitate release of the cured product from the base of mold. The release film may be elastic if needed to conform to a desired topography or to, for example, a 3-D mold, or it may be dimensionally stable, smooth surfaced or textured to suit. The release film may also be employed to influence shape or to impart a particular texture to the product or to emboss the same. This release film is then removed after the matrix has been partly or wholly cured.

A fabric material may also be used in lieu of, or together with, a release film to provide a desired outer surface. This may be accomplished by laying the fabric onto the fibrous material which has been wetted with the reactant mixture forming the polyurethane matrix. In this embodiment, the fabric material should be placed on the wetted fibrous material before the polyurethane-forming reaction has taken place to any substantial extent. The fabric may be used to mold the surface of the product or it may itself become an integral part of the product. If the fabric is to be used to mold or emboss the product, it should be selected so as to be non-reactive with the urethane-forming reactants to acilitate its release. On the other hand, if the fabric is intended to serve as a permanent part, of the surface of the product, it should preferably be chosen to react with or mechanically bond to the urethane forming reactants and to provide other desired surface features, e.g. to allow or prevent complete or partial strikethrough of the polyurethane resin as may be desired.

The fabric when used as described in the preceding paragraph, may vary greatly with respect to its composition and/or construction. Fabrics comprised of synthetic fibers such as polyester, polyethylene, polyaramid, polypropylene or like fibers which tend to be hydrophobic are preferred. However, in the case of certain moisture-cure urethanes, hydrophilic fibers may be of advantage.

The fabrics used for this embodiment may be woven, non-woven, knit, braided, stitch-bonded or combinations thereof, optionally replaced by or employed with laid yarns or filaments or random cut or continuous fibers.

Various alternatives are contemplated for making the products of the invention. For example, if desired, a vacuum bag, platen, belt or nip pressure may be employed during the forming of the composite. These techniques may be used, for example, to provide the desired consolidation, surface texture or topography to the composite. A preferred embodiment is to employ one film that serves as all or part of a vacuum bag as a product is being formed. After that film has been bound to the matrix, it becomes a permanent layer of that product.

Typically, when a plastic vacuum bag is used, either it is a release material itself or a release material is typically placed between the plastic vacuum bag containing the wetted fibrous layer or layers and the fabric and/or film placed thereon. Vacuum is applied as the polyurethane matrix is formed. The interior surface of the bag is drawn by the vacuum down against the release layer which in turn presses against the reinforcing or surfacing fabric or barrier film as the polyurethane matrix is formed.

In a further feature of the invention, the present products may be cut, vertically or at any other desired angle, so that the fiber ends of the fibrous reinforcement within the matrix are exposed. This can be done to provide a surface of increased wear resistance for products made therefrom or for cosmetic or other reasons. According to this embodiment, a single layer of polyurethane matrix with fiber reinforcement, but, preferably, multiple layers of the same and separated or covered by polymeric film, may be rolled up, with or without using a mandrel, to form a cylindrically shaped composite product. This can then be cut in a direction transverse to the longitudinal axis to provide a disc or washer-like composite product comprising the matrix with ends of the reinforcing fibers exposed. This method may be used to prepare brake facings, outsoles, top lifts or the like where wear resistant surfaces are required. The product to be cut, according to this embodiment, may be formed directly on a mandrel by co-winding one or more wet fabric plies on the mandrel, with one or more polymer films on and/or between fabric plies and curing the windup to form the polyurethane matrix in situ. If multiple polymeric-film plies are employed, typically one has been perforated.

Alternatively, the product to be cut may be wound up while wet without a mandrel for subsequent curing and cutting.

Rather than roll up the product on itself or on a mandrel, the product, whether single ply or multiple alternate plies of similar or dissimilar materials, may simply be cut at the appropriate angle to expose the fiber ends. The angle may be perpendicular to the axis of any reinforcing/wear surface fiber, although other cutting angles are desirable in certain cases, to provide a particular grip/slip or cosmetic effect.

The polyurethane-forming reactants used in Ser. No. 08/236,258 may be used for present purposes. These reactants are particularly useful as they permit ready wetting of the fibrous reinforcement material while the reactants have a low molecular weight and particle size is small so that mobility of the reactants is high, facilitating wet out of the surfaces of the fibrous component. Furthermore, their reaction rates can be controlled to permit the required laying up and consolidating of a desired number of layers before significant reaction occurs. This also facilitates forming the product before the matrix changes to the solid state thus avoiding permanent stress on the matrix or reinforcing fibers as a consequence of molding after the matrix is a solid.

Typically, the polyurethane-forming reactants comprise (A) an aliphatic or aromatic isocyanate, e.g. an isocyanate prepolymer such as isophrone diisocyanate or diphenylmethane diisocyanate and (B) a hydroxy component such as a polyether or polyester polyol or a mixture thereof with other chemicals such as polypropylene glycol. Any conventional polyurethane-forming components may be used for this purpose provided the polyurethane reaction occurs at a temperature below the melting point of the fibrous component. Preferably, the polyurethane is formed by separately preheating the reactants (A) and (B) to a temperature of, for example, 30–80° C., metering and mixing the reactants together and applying the reactant mixture about the fibrous component by, for example, spraying, troweling, or between nip rolls, the fibrous component or components being held in a mold or otherwise supported at ambient (18° C.–32° C.) or elevated temperature (up to the melt point of the fibrous component) while wet out of the fibrous component becomes thorough. The subsequent in situ reaction is an exothermic one which can be controlled, if necessary, to keep the temperature well below the melting point of the fibers involved. Heat to accelerate a cure can be beneficial. Usually, the temperature will be kept below about 70° C. although higher temperatures, e.g. up to about 120° C., may be used with certain fibrous materials.

As an example of one specific embodiment of the invention, several plies of non-woven fabric composed of high tenacity polyethylene fibers are placed on top of each other and wetted with the polyurethane-forming reactants. A six-mil thermoplastic clear aliphatic barrier polyurethane film is placed on an exterior surface of the wetted-fabric layup. Consolidation is aided by vacuum. The polyurethane-forming reaction is then allowed to proceed in generally the manner described in Ser. No. 08/236,258 so as to form a polyurethane matrix around the polyethylene fibers with the polyurethane film bound thereto. The resulting composite may be about 0.01 to 10 inches thick although other thicknesses may be effectively employed.

The polyurethane film used in the above example can be selected to provide a product with a variety of surface characteristics. For example, the film may be receptive to ink and thus provide means for coloring or printing on the surface. Film with a planar surface suitable for high-resolution printing or another surface or coloring means for excellent color depth may be selected. The polyurethane barrier layer is advantageously applied by vacuum processing as all or part of a vacuum bag or in a plastic bag or the equivalent so that air pockets affecting color or performance of the product are removed as the polyurethane matrix is being formed in situ. This may be done by putting a release sheet which is textured on one or both sides, and a vacuum bag on one or both sides, of the layup as the polyurethane matrix formation is taking place. This must be done before the polyurethane matrix is in the solid state, preferably while the reactant parts are liquid and mobile. Adhesion is obtained between the film and the fiber-reinforced matrix of the composite. Without intending to be limited to this explanation, a chemical reaction occurs between the polyurethane film, which bears reactive OH groups, and NCO groups present in one of the matrix reactants in excess of the 1:1 ratio of NCO required to mate with OH in the other matrix reactant. Usually a reactant NCO:OH ratio of 1.05:1 to 1.15:1 is appropriate to provide the required matrix-forming reaction and leave some NCO for reaction with OH in the film material. The film is thus adhered chemically to the matrix although mechanical adhesion is also possible. Such mechanical adhesion can be controlled by consolidation of the liquid polyurethane-forming reactants into and around surface irregularities or engineered receiving shapes or holes in the fibers or films present, and effecting cure while consolidation conditions endure.

It is possible to provide printing on either side of the thermoplastic polyurethane film if desired. It is also possible to tint or intensively color the film throughout. The matrix may also be tinted or intensively colored before it cures and, albeit not preferable, after it cures. It is also possible to color or print some or all the reinforcing fabrics before the matrix is put in place. An advantage of doing this is that the color of the reinforcing fabric will not migrate subsequent to curing of the matrix, the color being shielded from UV rays, abrasion, and similar hazards by the urethane matrix which by itself can be clear, allowing the use of printing materials and techniques that might be otherwise unqualified because of marking off or the like.

In another embodiment of the invention, the fibrous component may be replaced in whole or in part or supplemented by the addition of particulate reinforcement or filler or colorant material. This may include, for example, metal, plastic or rubber particles, minerals or inorganic filler materials, or organic pigments. Other examples of such particulate reinforcing materials include silicon carbide, silica, carbon black, zinc oxide, titanium dioxide, organic pigments or microspheres.

The invention is illustrated by the accompanying drawings wherein FIGS. 1–6 schematically show various aspects of the invention.

More specifically, FIGS. 1(a)–1(e) generally illustrate the process of the invention wherein three plies of fabric (2) are laid one on top of the other as shown in FIG. 1(a) on an appropriate support member or base (4). The layup is then thoroughly wet as shown in FIG. 1(b) with the liquid urethane-forming reaction components. Alternatively, the plies of fabric (2) may be wet out prior to being stacked on the layup. After layup of the fabric plies (2), a polymeric film (6), e.g. thermoplastic polyurethane film, is placed on the wet layup as shown in FIG. 1(c). The resulting layup is consolidated or pressed together as shown in FIG. 1(d) and then held in position as the polyurethane is formed and cured as shown in FIG. 1(e) to give a solid article with the film (6) firmly bonded to the composite resulting from the in situ formation of the polyurethane matrix (8) about the fabric plies (2).

As described earlier, the inside or outside of the film (6) may carry print or a design on either of its sides. The outer surface of the film (6) may also have a matte finish or the like as may be desired. Alternatively the fabric (2) may carry a print or design. The fabric and/or film may also be colored although if there is a design or print on the fabric or on the bottom or second side of the film, the film is preferably otherwise clear so that the design or print will show through.

Any one or more of the film, fabric and polyurethane matrix can be colored to give the effect ultimately desired in the final product.

A film (6) may also be provided on the other side of the fabric plies, i.e. adjacent the support (4). The film may be the same or different from the top film in terms of composition, construction, color and the like.

FIG. 2 shows one way of consolidating a wet layup essentially as shown in FIG. 1, except for the addition of bottom film (6) as well as the top film (6). While a support or base (4) is shown, this is optional. In this case, the wet layup and its support (4) are positioned within a plastic bag (10). When a vacuum is drawn through a tube (12), the bag collapses around the structure to press the film and fabric plies together as the polyurethane is formed and cured in situ. A release agent or film (not shown) or air bleeding aid may be positioned between the inner surface of the bag (10) and the matrix as it cures to keep the bag from sticking to the surface of the product or to aid in air removal. Alternatively, the vacuum-bagging film may bond to the matrix and become a permanent component of the product formed.

Figure 3:
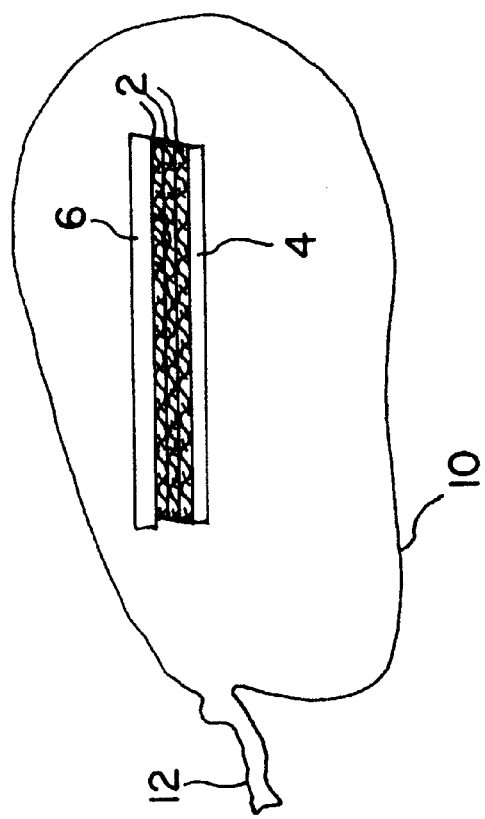

FIG. 3 diagrammatically illustrates another way of making the present products using a mold comprising male and female parts (14) and (16) respectively. In the embodiment shown, a release film (18) is provided between the mold part (14) and the polymer film (6). As shown, the structure comprises top and bottom polymer films (6) both of which, after molding and curing are bonded to the composite of matrix (8) and fabric reinforcement (2). As will be understood, the mold parts (14) and (16) are brought together to shape the structure under pressure as the polyurethane matrix is formed and cured.

Figure 4:
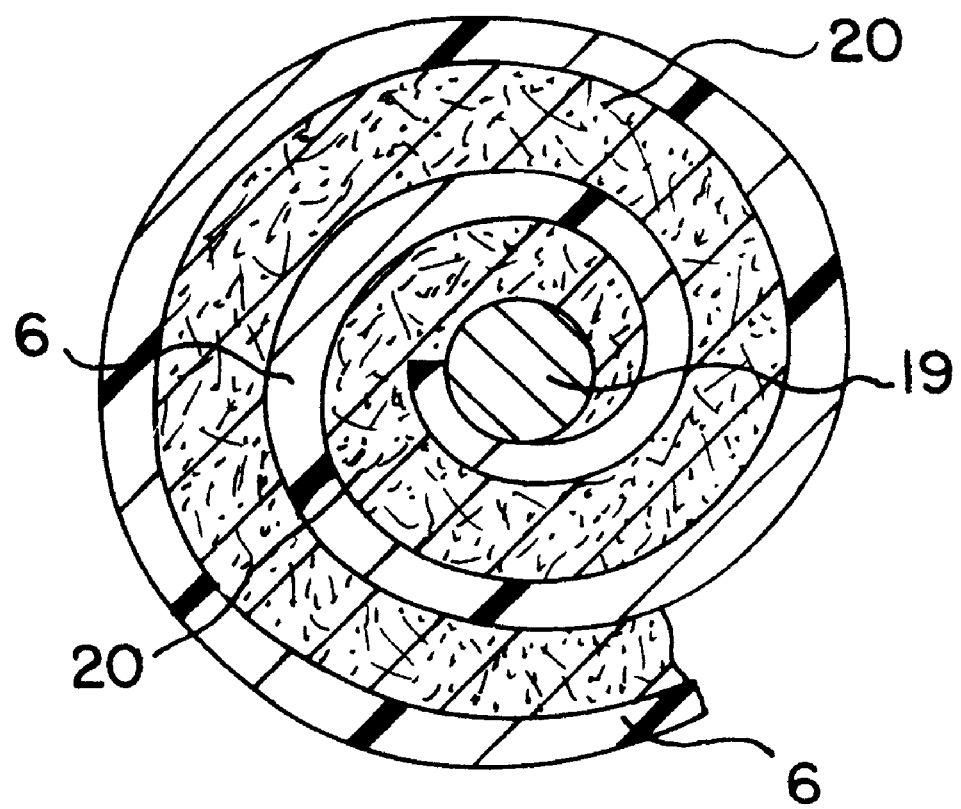

FIG. 4 diagramatically shows a cut side of a product prepared according to the invention. In this embodiment, one or more wet fabric plies are wound around a mandrel (19), the fabric plies being first wet with the urethane-reactants. Polymeric film (6) is co-wrapped around the fabric ply and the polyurethane matrix formed and cured in situ after which the tubular structure is removed from the mandrel and cut across the longitudinal axis of the resulting product to provide, for example, wafers, discs, or the like. FIG. 4 shows the cross section which results on cutting when only one ply of fabric reinforcement (2) is incorporated. The reference numeral (20) represents exposed cut ends of fibers of the reinforcing fabric. With proper selection of the fabric, the exposed fiber ends can be used to provide a surface which has exceptional wear resistance among other characteristics. The bands or layers of polymeric film (6) alternate with the fabric layers to provide further variations in the characteristics of the cut surface shown in FIG. 4.

Figure 5:
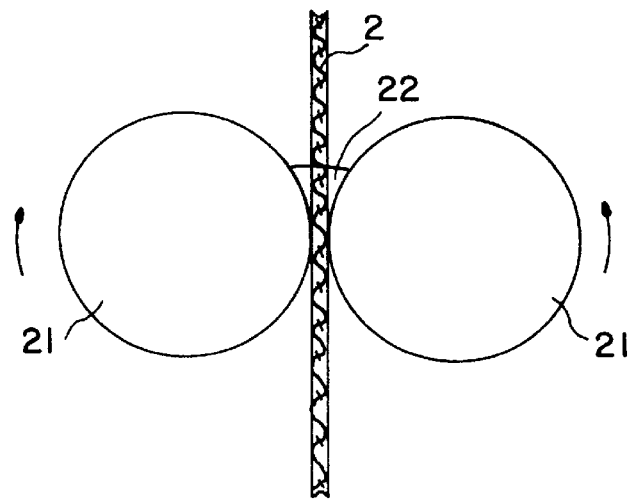

FIG. 5 illustrates one way of wetting the fabric with the polyurethane-forming reactants. According to this embodiment, dry reinforcing fabric (2) is fed to the nip of driven nip rolls (21). A puddle of metered and mixed urethane-forming reactants is maintained at the nip, the fabric as withdrawn from the other side of the nip being thoroughly wetted with the reactants.

Figure 6:
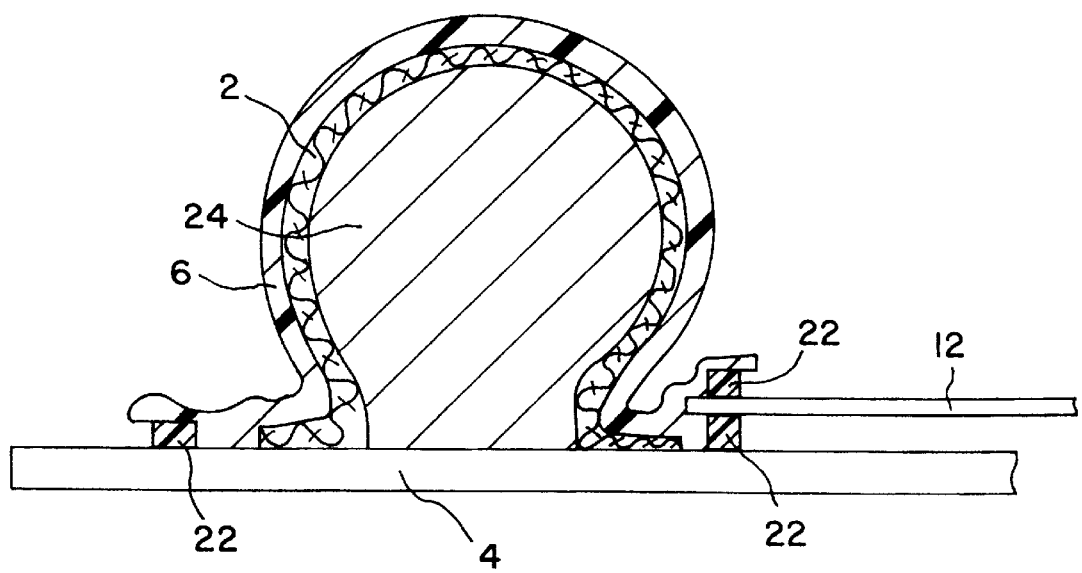

FIG. 6 illustrates an important feature of the invention where the barrier film (6) constitutes all or part of the plastic bag used to consolidate the wet layup of fabric (2) and film (6) for curing on a base (4) for a male mold (24). The barrier film (6) is sealed at (22) to the support (4) and around the wet fabric (2) and a vacuum is drawn through a tube (12) as in FIG. 3. This provides a highly effective way of preparing molded products according to the invention with the film (6) being pulled tightly against the fabric for bonding to the urethane matrix as it is formed with the layup over the mold.

The invention is more specifically illustrated by the following examples which are not intended to be limiting in any way.

EXAMPLE 1

This example involves the use of (A) aromatic thermoplastic polyurethane film (Argotec, Inc., product number 18402), 15 mils thick, having a Durometer Shore A hardness of about 88, and (B) polyester knit fabric about 22 mils thick comprising two layers, two axes, of polyester yarns, 17 per inch on each axis, oriented +45° and −45°, 1000-denier, 192-filaments (Hoechst Celanese type 787) and a layer of non-woven Sontara 8001 polyester (Dupont) and a polyester knitting yarn (1 ply of moderately oriented 190-denier, 34 filaments) knit through the non-woven and around said yarns. These fibers are all amply harder than either of the two categories of polyurethane utilized here.

Plies of (A) and (B) were alternately laid up to provide an alternating-ply structure comprising ten plies each of (A) and (B) laid one on top of the other. As each ply (B) was laid up, it had been wet with about 1.5 times its fiber weight with 100% co-reactive parts of cross-linking polyurethane-forming liquid matrix material and placed against a companion ply (A). The Shore A Durometer of the cured matrix material surrounding the fibrous components B is about 55.

The resulting product, after curing, comprised alternating plies of a composite composed of fabric (B) dispersed in a matrix of thermoset polyurethane formed in situ and thermoplastic polyurethane film (A) bound to the composite. In this case, one exposed lateral surface was the composite of fabric (B) dispersed in polyurethane matrix while film (A) constituted the other exposed lateral surface. However, the plies could be arranged to provide either film (A) or the fabric-matrix composite on both sides.

The foregoing example was carried out by placing the laid up plies of wetted fabric (B) and film (A) in a plastic bag with the application of vacuum to remove any trapped gases. Film (A) can be the vacuum bag, all or part of it. The vacuum bag processing also served to consolidate the plies more intimately. As an alternative to using the vacuum bag, the plied structure could be subjected to consolidating pressure by means of platen or squeeze rolls to give the final product the desired density, thickness, permeability, texture, topography or the like.

EXAMPLE 2

Alternate plies of the plies (A) and (B) described in Example 1 were rolled up on a mandrel to form a cylindrical shape while the matrix was still in the liquid state. Tension on the elastic polyurethane film (A) provided appropriate consolidation. After the product had been cured and the mandrel removed, the product was sliced perpendicular to its axis to form wafers with surfaces having some exposed fiber ends of the composite plies and some layers or bands at film (A). This provided a surface of greatly enhanced wear resistance and grip. The cut surface included bands of harder film (A) and softer composite. Within the composite, there is a variation of hardnesses because of the differences in hardness of the polyurethane matrix and the fibrous component. These hardness variations enhance control over grip/slip of contact surfaces, for example, tile flooring.

As an alternative to the above, the multiplied structure was sliced after being laid up in parallel plies in the form of rectangular "loaves," the slices made in any direction intersecting the plane of the plies exposing fiber ends rather than the sides thereof.

The following 100% co-reactant polyurethane-forming composition was used in the foregoing Examples 1 and 2. This product is available commercially as Q-thane QC 4191 A/B (K.J. Quinn & Co.) and comprises the following Parts A and B:

Part A: methylene bis (4-cyclohexyl isocyanate)
    poly (oxypropylene glycol)
    monomeric glycol
this prepolymer (Part A) having a % NCO of around 15%
Part B: polyester polyol (functionality >2.0)
    monomeric glycol
    dibutyltin dilaurate catalyst
100 parts of Part A and 304 parts of Part B by weight were metered and mixed to form the polyurethane matrix. Part B was preheated to about 70 degrees C before being combined with Part A to facilitate accurate metering and intimate mixing. The mix was applied to the fibers at approximately 50 degrees C. The plies (A) and (B) were laid up at ambient temperature (about 25° C.). After consolidation, these examples were cured overnight at 60 degrees C., in accord with the amount of catalyst added. The cured polyurethane resin showed excellent hydrolytic stability. The modulus of the cured product is low, in keeping with the need for a flexible product.

Q-thane LQC 24-195 A/B is an aromatic version of QC4191A/B. It is less costly and suitable where light fastness need not be maximized. Part A of 24-195 A/B contains diphenyl methane-4,4'-diisocyanate (composed of a physical mixture of two or more isomers). Part B of QC 24-195 is approximately the same composition as Part B of 4191. QC 24-195 A/B may be substituted for QC4191A/B in the foregoing Examples 1 and 2.

Other features of the invention are illustrated by the following examples:

EXAMPLE 3

Separate plies of Argotec clear 93 AV aliphatic thermoplastic polyurethane barrier film (A) (3-mils thick and having a Shore hardness of about 93) were printed with a normal image, in one case, and its mirror image, in the other case, and these were laid up in register on opposite sides of, and with both images against a fabric (B), the latter being a 1 ounce per square yard woven fabric of polypropylene weft and polyester warp. Just before the film (A) plies were positioned on opposite sides of fabric ply (B), the fabric was wet with about 1 ounce per square yard of the same resin system as used in Examples 1 and 2 to form a thermoset polyurethane matrix, the film plies (A) being placed and consolidated on both sides of fabric (A) before any significant cross-linking reaction occurred. Thereafter, the polyurethane matrix was formed in situ using the same conditions as in Examples 1 and 2 with the film plies (A) held in register. After curing, the product was essentially clear and transparent except for the printing on the films.

In this case, cure was carried out with a platen applying pressure to the layup or assembly. Alternatively, vacuum could be used to obtain similar results.

The resulting product can be used to provide labels, insignias, flags, awnings, banners, flexible signs, decorated tape products, apparel fabric or the like protected by the full thickness of tough barrier films on both its sides against wear, sunlight, and the like. For example, the product can be made with film-protected printing inks yielding a flag design which is protected against direct contact with other surfaces or exposure to rays or contaminants that would normally abrade or fade such markings. On cutting and flexing, the edges did not fray.

It will be appreciated that the procedure described in Example 3 can be varied. For example, only one ply of the barrier film may be used for application to one surface of the composite rather than two covering both sides. Other variations will also be evident.

EXAMPLE 4

Du Pont Xymid 1573 stitch-bonded stretch fabric comprising Dacron, Lycra, and Kevlar fibers dyed gray with an aggregate area weight of approximately eight ounces per square yard is used as ply (B). This ply was placed with its "back" or stitch side against a male mold shaped as a last for a shoe. Ply (B) was then wet out with QC4191A/B as in the preceding examples using a resin to fiber ratio of about 1.8:1.

Argotec clear 93AV aliphatic thermoplastic polyurethane barrier film (A) (7-mils thick) with a print pattern on one side, was then placed on the wet ply (B) with the print pattern facing down on the wet ply (B). Vacuum was applied, using the film (A) as part of the vacuum bag. The film (B) stretched to conform to the mold, and so did the wet fabric, while both were held against each other such that the liquid resin parts of (B) wet the surface of (A). The liquid polyurethane-forming reactants were then allowed to cure with plies (B) and (A) held conformingly in place on the mold. The plies bonded at their interface. In this case, the mold was a polyethylene shoe last and the product a launderable gray shoe upper with a clear, permanent, tough skin over printed decoration.

Various products can be made by the method shown in Example 4. For example, if the mold is a Teflon cylindrical rod, with ply (A) wrapped completely around the rod and positioned such that it is against the rod with wet ply (B) similarly wrapped around the rod over ply (B), a hose or duct can be formed on curing of the matrix resin. The stretch characteristic of the Xymid effects appropriate consolidation because it is tensioned suitably during wrapping. The resulting product has a smooth, barrier inside surface conforming with the mold surface supported by the fiber reinforced composite which provides an outside surface of polyurethane-matrix composite to enhance protection and reduce the tendency of the hose to kink on bending, particularly if strips of thermoplastic polyurethane, wire, filaments of fiber, or yarns are co-wound with the wet fabric.

EXAMPLE 5

The same components and methods described in Example 4 were employed with a female mold substituted for the male mold, its cavity being the shape of an outsole of a shoe. Particles e.g., crumb made from wornout tires having more than 0.1% moisture content and granulated thermoplastic polyurethane, both of which adhere well to the cured matrix utilized were placed in the mold when wet out with Q-thane QC 27-127. Qthane QC 27-127 is a one-part urethane-forming composition which comprises: diphenylmethane-4, 4'-diisocyanate poly (oxypropylene) glycol (functionality >2.0) hydroxy-bearing hydrocarbon resin and cure catalyst such as dimethyl ethanol amine as required for moisture curing. While used as a matrix material, this resin is a good adhesive for particles, crumb, granules, and the like.

While this is a one-part, moisture-curing urethane, moisture from a source outside its one part, such as ambient moisture, surface moisture or mechanically-added moisture, is desirable to effect a cure. Alternatively or supplimentarily, other polyols can be added in lieu of moisture or in addition to moisture.

With the wet stretch fabric held across the opening of the mold, and the wet crumb-granule distributed inside the mold cavity, and the thermoplastic urethane film held against the stretch fabric and employed as part of a vacuum bag, the layup was drawn by vacuum into the cavity of the mold and consolidated there, the resin being cured while so consolidated. The thermoplastic urethane film, having served as part of a vacuum-bag arrangement, became a permanent component of the product. This is an advantageous way to form the outsole and sides for a shoe.

Alternatively, this crumb/granule wet with water-curing polyurethane-forming liquid could be configured in a spiral or rectangle as described in Example 2.

If a barrier film is not desired as a permanent component of the so molded structure, then a stretch release film (e.g., silicone rubber with a suitable texture for the end product) can be substituted for the thermoplastic urethane mentioned above.

EXAMPLE 6

A female mold having a cavity of the shape of a helmet such that it has negative draw (i.e. the part must be flexed to remove it from such mold) is positioned with a white 7-mil aliphatic thermoplastic Argotec AV93 film vacuum drawn into its cavity and so held against the mold. A wet nylon 5 ounce per square yard conformable circular knit wet with Q-thane QC4270, metered and mixed parts A and B, is then placed over the cavity of the mold with a stretch, e.g., silicone rubber, release film in contact with the fabric on its side away from the mold. This release film/fabric is co-drawn into the mold such that the wet fabric is in consolidated contact with the white film while primary cure occurs. With some pressurized air assistance, the partially-cured part can be removed from the mold with recovery of its molded shape despite its ultimate Shore D hardness of about 70. Subsequent to removal from the mold, the molded part is post cured for about 16 hours at about 90° C. to achieve ultimate hardness.

Q-thane QC 4270 A/B comprises:

Part A: diphenyl methane-4,4'-diisocyanate
poly (tetra methylene ether glycol) polyether polyol
poly (oxypropylene) polyol
modified MDI (e.g. Dow 2143L)

Part B: monomeric glycol curative (the molecular weight and functionality can be varied to alter hardness, physical properties, clarity, etc. of the cured polyurethane).
1,4-butane diol The % NCO can be varied as desired but 14.5% is a typical quantity.

Parts A and B should be dynamically mixed in proportion by weight of A:B of about 87:13.

After cure, the opaque matrix is a suitable back for the white film on the outer surface of the helmet as the color is suitable viewed from the outside, and the matrix-film bond is strong.

A variety of modifications can be made in the above. For example, a polypropylene knit can serve as the reinforcing fabric. Typically this is a solution dyed four ounce per square yard stretch fabric. A clear exterior barrier thermoplastic polyurethane film and a clear matrix could also be employed to give a color variation. Further, the film can have some of its second or inside surface printed to give another color variation. Still further, dye can be added to any of the resin systems used herein, typically to the polyol side before it is mixed with its mating isocyanate part or to a one-part resin system to give a coloring variation.

The foregoing description is given only for purposes of illustration and it will be evident that other variations and modifications are contemplated. Accordingly, the scope of the invention is defined in the following claims wherein:

What is claimed is:

1. An article which comprises (1) a composite comprising a polyurethane matrix including fibrous or particulate reinforcement, the polyurethane being formed in situ about the reinforcement by reaction of polyurethane forming components at a temperature below the melting point of the reinforcement and (2) a polyurethane film bound to at least one surface of the composite, the film being bound to the composite by reaction between OH groups of the polyurethane film and NCO groups of the polyurethane matrix which is formed in situ.

2. The article of claim 1 wherein the fibrous reinforcement comprises one or more fabric layers.

3. The article of claim 2 wherein the reinforcement comprises a plurality of superimposed layers of woven, knitted, braided, stitch-bonded or nonwoven fabric.

4. An article according to claim 1 wherein multiple layers of fibrous reinforcement are laid up with polymeric film positioned against or between at least some of the layers.

5. An article according to claim 1 wherein at least one of the film or fibrous reinforcement carries a print or design or is colored.

6. An article according to claim 5 wherein the matrix is transparent.

7. An article according to claim 2 having fiber ends of the fabric reinforcement exposed.

8. An article according to claim 4 wherein the printing ink or color is protected from abrasion by the matrix or by the film.

9. An article according to claim 1 wherein grip is enhanced by bands or zones of softer and harder materials to enhance grip.

10. The article of claim 1 which is launderable.

* * * * *